(12) United States Patent
Shaw

(10) Patent No.: US 6,574,707 B2
(45) Date of Patent: Jun. 3, 2003

(54) MEMORY INTERFACE PROTOCOL USING TWO ADDRESSING MODES AND METHOD OF OPERATION

(75) Inventor: Craig D. Shaw, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/849,704

(22) Filed: May 7, 2001

(65) Prior Publication Data

US 2002/0166028 A1 Nov. 7, 2002

(51) Int. Cl.[7] .............................................. G06F 12/00
(52) U.S. Cl. ...................... 711/118; 711/105; 711/202; 711/146; 711/217; 711/218; 711/219; 365/230.04; 365/233; 365/236
(58) Field of Search ................................. 711/118, 201, 711/105, 146, 217–219; 365/230.04, 236

(56) References Cited

U.S. PATENT DOCUMENTS

| | | | |
|---|---|---|---|
| 5,611,071 A | * 3/1997 | Martinez, Jr. | 710/307 |
| 5,715,476 A | * 2/1998 | Kundu et al. | 710/35 |
| 5,729,504 A | 3/1998 | Cowles | 365/236 |
| 5,793,693 A | 8/1998 | Collins et al. | 365/230.01 |
| 5,812,488 A | 9/1998 | Zagar et al. | 365/233 |
| 5,835,929 A | 11/1998 | Gaskins et al. | 711/3 |
| 5,835,945 A | * 11/1998 | King et al. | 711/120 |
| 5,904,732 A | * 5/1999 | Greenley et al. | 710/57 |
| 6,009,489 A | 12/1999 | Mergard | 710/107 |
| 6,021,480 A | * 2/2000 | Pettey | 711/201 |
| 6,199,118 B1 | * 3/2001 | Chin et al. | 710/1 |
| 6,363,032 B2 | * 3/2002 | Merritt | 365/236 |

* cited by examiner

Primary Examiner—Hiep T. Nguyen
Assistant Examiner—Ngoc Dinh
(74) Attorney, Agent, or Firm—Robert L. King; James L. Clingan, Jr.

(57) ABSTRACT

A memory interface (15) and method of use implements a cache (14) bursting addressing technique which begins a read of main memory (16) in a wrap around mode before automatically switching into a linear addressing mode. The use of two modes which automatically change eliminates an access delay to the main memory when switching modes and optimizes system performance by providing a most critical word first in a first cache line fill and advancing to a sequential address following the first cache line. The sequential address has a higher probability of next use by the processor than any other address. The automatic mode change may be overridden by the memory interface.

17 Claims, 3 Drawing Sheets

MEMORY INTERFACE PROTOCOL USING TWO ADDRESSING MODES AND METHOD OF OPERATION

FIELD OF THE INVENTION

This invention relates generally to semiconductor memory devices, and more specifically, to memory interfaces between a processor and a memory.

BACKGROUND OF THE INVENTION

Conventional caches typically request information from a main memory in the form of a bursting Flash memory in response to a request from a processor. When information is requested from main memory, it is stored in lines of the cache in words that may be of arbitrary size. Cache lines containing multiple word information typically store the information in sequentially ordered words. A processor requests a particular word from its cache. When reading the requested information from a cache line, the processor will always desire only the requested word. However, the requested (i.e. most critical) word may or may not be a first word of a cache line. Should information requested by the processor not be contained within the cache, this situation is termed a "miss". The address of the requested word is then provided to the main memory for subsequent retrieval of the requested word. If the critical word of a cache line desired by the processor is not the first word, the cache line must be written to in a wrap fashion to back fill the first portion of the line prior to the critical word. Such information addressing is commonly known as a wrap around mode because in order for the line of information being written to the cache to be valid, all information words must be written to the cache line.

A disadvantage with the wrap around addressing mode is that main memories are designed to repeat the information for the same cache line until another initial access is made of the main memory. An initial access requires several clock cycles to get the information and reestablish proper timing. At least one initial main memory access must occur for every cache line that is retrieved. An initial main memory access typically involves: (1) broadcasting an address to the main memory; (2) sending a signal to the main memory informing the main memory that a new address has appeared; (3) decoding the new address by the main memory; (4) locate the information and use sense amplifiers to detect the logic value of each bit of information; and (5) capture and output the information. Therefore, the total overhead for each cache line fill, even in a burst memory system, is substantial and leads to significant performance delays.

Another addressing technique that may be implemented is known as linear addressing. In this technique, a cache line is always filled by a main memory from a first word to last word. The addressing is simple as information retrieval always begins from a beginning of a cache line. However, should a critical word desired by a data processor be a last word in a cache line, a severe performance penalty occurs in systems implementing longer cache lines.

Main memories are typically designed to support only one mode of addressing. Prior to being operational, a user must carefully follow specific mode programming instructions to place the main memory in an operation mode which will support either linear or wrap around addressing. Some commercially available memories do not support both modes. However, those memories that do provide a user with an addressing option function by remaining in the same addressing mode unless the programming procedure is repeated. Repeating the programming procedure to modify addressing modes is typically not feasible once a memory is initialized into a functional system.

BRIEF DESCRIPTION OF THE DRAWINGS

The present invention is illustrated by way of example and not limitation in the accompanying figures, in which like references indicate similar elements.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

Figure 1:
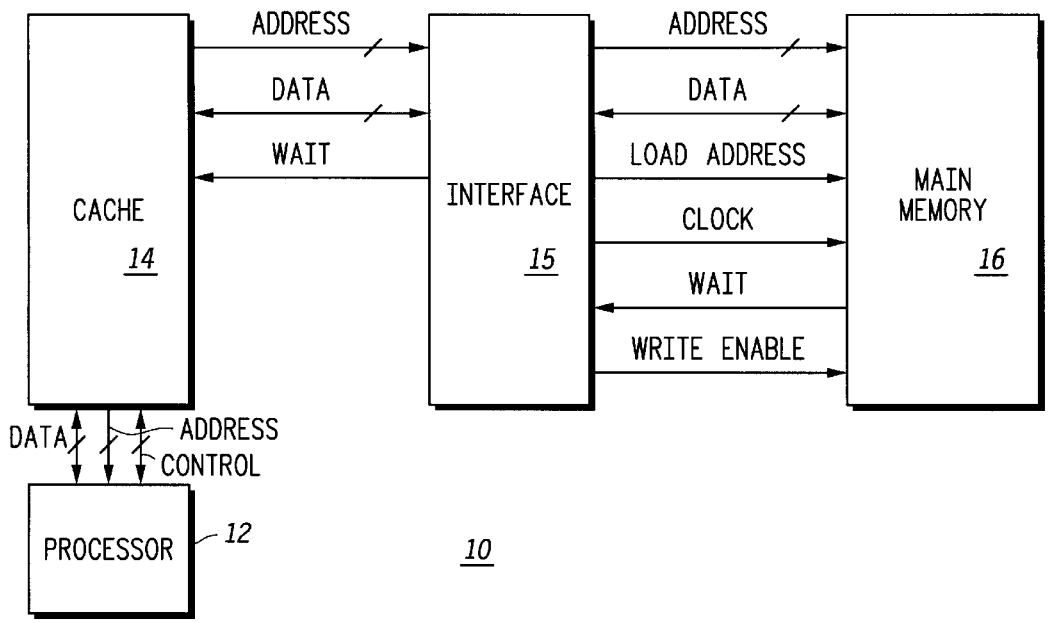
FIG. 1 illustrates in block diagram form a data processing system in accordance with the present invention.

FIG. 1 illustrates in block diagram form a data processing system 10 generally having a Processor 12, a Cache 14, an Interface 15 and a Main Memory 16. In the illustrated form a bi-directional data bus and bi-directional control bus connect Processor 12 and Cache 14. An address bus is connected from Processor 12 to Cache 14. A bi-directional data bus is connected between Cache 14 and Interface 15, and an address bus is connected from Cache 14 to Interface 15. A Wait signal conductor for providing a Wait signal is connected from Interface 15 to Cache 14. A bi-directional data bus is connected between Interface 15 and Main Memory 16, and an address bus is connected from Interface 15 to Main Memory 16. A Load Address conductor for providing a Load Address signal is connected from Interface 15 to Main Memory 16. A Clock conductor for providing a Clock signal is connected from Interface 15 to Main Memory 16. A Wait signal conductor is connected from Main Memory 16 to Interface 15 for providing the Wait signal. A Write Enable conductor is connected from Interface 15 to Main Memory 16 for providing a Write Enable signal for use when Processor 12, Cache 14 and Interface 15 request that information be written to Main Memory 16. In the illustrated form, Main Memory 16 may be any of a variety of different memory types such as DRAM, Flash, EPROM, EEPROM, or SRAM, regardless of whether volatile or non-volatile memory.

In operation, Processor 12 utilizes Cache 14 exclusively for reading and writing data. Cache 14 is significantly smaller than Main Memory 16 and memory accesses are therefore much quicker. When data that is requested by Processor 12 is not in Cache 14, the Interface 15 functions to request Main Memory 16 for that information and to write it to Cache 14. This operation may also be considered as a request by Cache 14 to read the Main Memory 16. In response to a cache miss, Interface 15 provides Main Memory 16 with a Load Address signal. The Load Address signal initiates the providing of a running clock signal of successive clock pulses to the Main Memory 16. In response, Main Memory 16 will retrieve the information or data at the specified address provided by Interface 15. Once the data has been retrieved, it is output by Main Memory 16 via the Data bus to Interface 15 and then to Cache 14 for storage. Main Memory 16 functions to retrieve the data by providing the most critical word first. Remaining words of the same cache line are then retrieved successively. If the critical word is not the first word of the cache line being written (i.e. the word is misaligned to the cache line boundary), then a wrap sequence is performed to complete full retrieval of the cache line. In this manner, the cache line may be marked as being valid. As will be explained below, Main Memory 16 then functions to automatically change addressing modes from a wrap around mode to a linear mode without specific intervention by Processor 12, Cache 14 or Interface 15. The Main Memory 16 functions to "guess" that the most likely needed next address by Processor 12 will be the next successive address after the last word in the retrieved cache line. There is a high probability that this address will be requested by Processor 12 and be the next cache miss. However, in the event a jump to another address is required, Cache 14 and Interface 15 function to create another Load Address signal and provide a different address. In this manner, data processing system 10 is able to fluidly and efficiently burst multiple cache lines which are different and which have a high probability of use by Processor 12.

Figure 2:
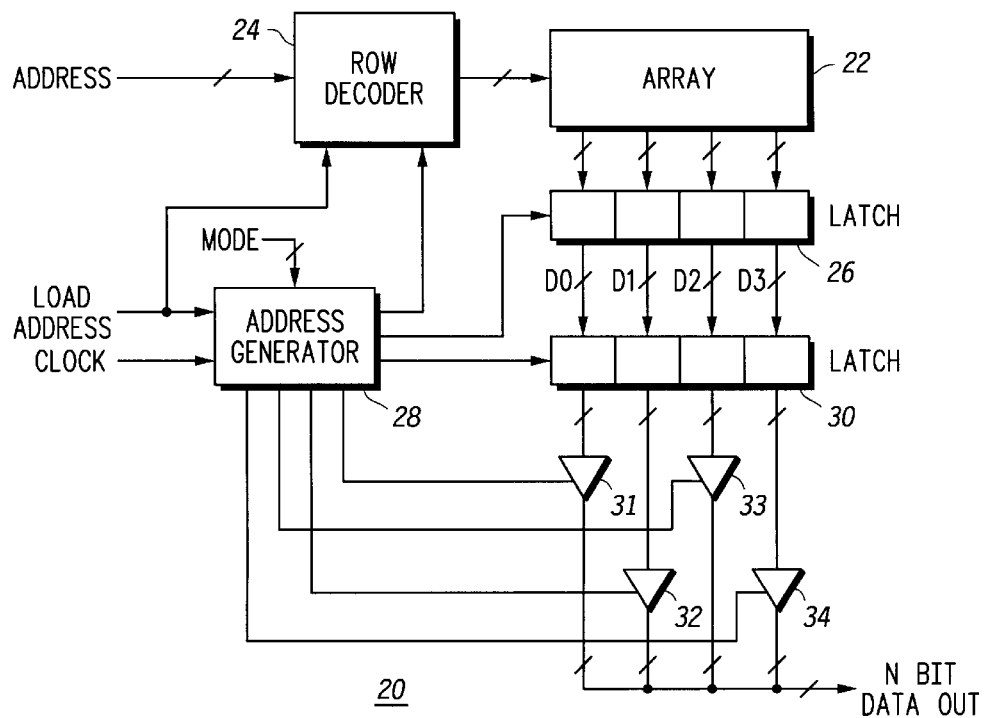
FIG. 2 illustrates in block diagram form a portion of the main memory of FIG. 1.

Illustrated in FIG. 2 in further detail is a portion of the Main Memory 16 of FIG. 1. Main Memory 16 generally has an Array 22, a Row Decoder 24, a Latch 26, an Address Generator 28, a Latch 30 and Drivers 31, 32, 33 and 34. Row Decoder 24 has an input for receiving an Address from Processor 12. Row Decoder 24 has outputs connected to multiple rows of memory cells (not shown) of Array 22. Array 22 has outputs for providing data in multiple words connected to Latch 26. A Load Address signal is connected to a first control input of the Row Decoder 24 and to a first control input of Address Generator 28. A second control input of Address Generator 28 receives a Clock (Clk) signal. A third control input of Address Generator 28 is connected to a Mode control signal, illustrated in one form as a multiple bit signal. A first output of Address Generator 28 is connected to a second control input of Row Decoder 24. A second output of Address Generator 28 is connected to a control input of Latch 26. A third output of Address Generator 28 is connected to a control input of a Latch 30. Latch 26 is a plurality of individual latches and has an output for providing multiple data words, such as D0, D1, D2 and D3, to Latch 30. Latch 30 is a plurality of latches and has multiple data outputs for providing the data words D0, D1, D2 and D3. For convenience of illustration, only four data words are illustrated but it should be well understood that the present invention may be used for any data width implementation. Address Generator 28 provides a plurality of control signals at a plurality of outputs. Each control signal provided by Address Generator 28 is connected to a control input of a predetermined one of output Drivers 31–34. Each of Drivers 31–34 provides a data word to collectively form an N-bit data output signal, where N is an integer and varies based upon implementation choice.

In operation, Main Memory 16 receives an Address value from Interface 15 at its Row Decoder 24 and the Address is captured in response to a Load Address signal. Main Memory 16 has memory cells, organized by groups of words wherein the groups are sequential and wherein an initial group is selected by a first portion of the Address, and a word within the initial group is selected by a second portion of the Address. The initial row is identified by the captured address and that row is output by Array 22 to Latch 26 to be controllably output as an initial burst of a group of words. The Address Generator 28 also receives the Load Address signal. Address Generator 28 is used to increment the address of the specific row of Array 22 that was captured and provided to Latch 26. Array 22 outputs in parallel data words D0 through D3 of the chosen row. Since Main Memory 16 functions in a bursting mode, the information is pipelined to another stage in the form of Latch 30 that is also under the control of Address Generator 28. Address Generator 28 functions to control the exact sequencing of information words of the cache line by the control inputs to Drivers 31–34. Address Generator 28 functions to determine when Latch 26 and Latch 30 actually latch data in addition to determining when Drivers 31–34 are enabled. It should be well understood that differing latching arrangements could be implemented. For example, Latch 26 and Latch 30 may have their data inputs connected in parallel to Array 22. Additional drivers such as Drivers 31–34 could be connected to the outputs of both Latch 26 and Latch 30 and controlled by Address Generator 28. The Mode signal of Address Generator 28 functions to select the address generation sequence required to perform the mixed addressing mode of performing a single wrap around cache line fill and then switching to a linear addressing mode until another Load Address signal occurs. Additionally, other addressing modes may be implemented with the Mode signal should a user or Processor 12 desire that a particular execution sequence or operation be performed in only one addressing mode or other combinations of addressing modes.

Row Decoder 24 may be implemented as a 1 of N decoder in combination with an up counter (not shown). The up counter receives the Address value as an initial counter value and is incremented by Address Generator 28. The Load Address signal is used to determine when the initial count value should be captured. The value of the count is then decoded by the 1 of N decoder to provide a row address for addressing into Array 22.

In the illustrated form a single group D0 through D3 is illustrated as being provided by Array 22. In a common form, Array 22 provides bursting groups of words and has a burst mode of operation. It should be well understood that the present invention may be used wherein an array outputs concurrently multiple groups of words, each group representing a cache line. In other words, multiple cache lines may be returned from Array 22 via a single access. Also, Address Generator 28 may be configured to enable only one or a portion of Drivers 31–34 to output only a single word or a portion of the words stored by Latch 30.

Figures 3, 4:
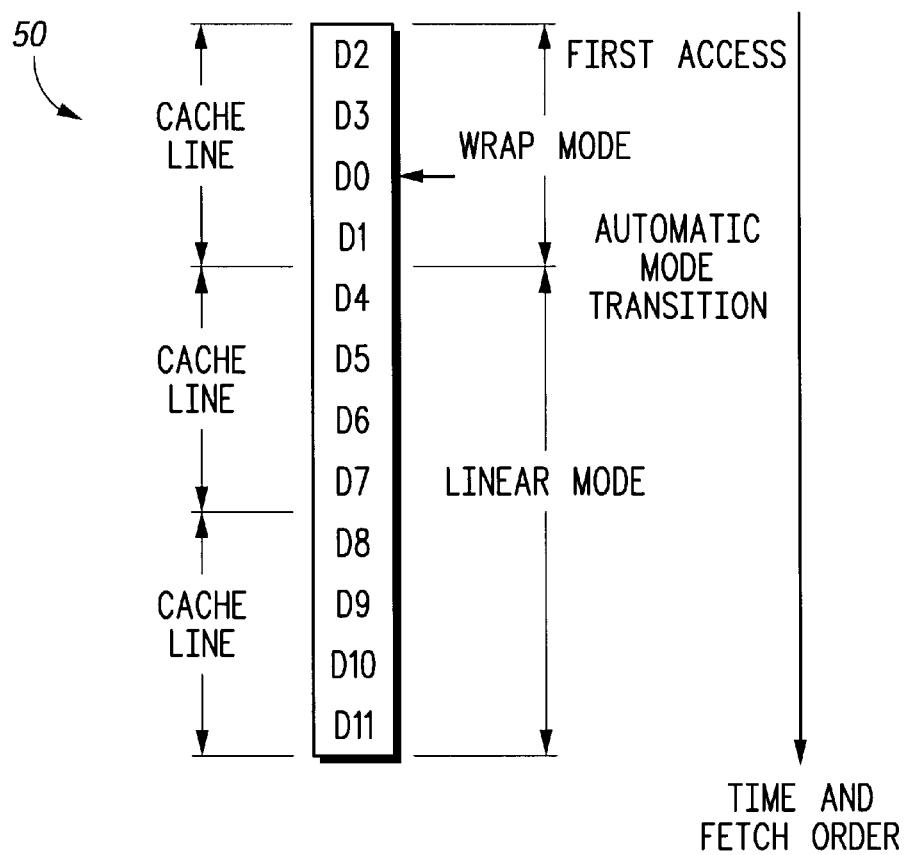
FIG. 3 illustrates in block diagram form an exemplary arrangement of data bytes in multiple cache lines of a cache memory in accordance with the present invention.
FIG. 4 illustrates an exemplary addressing flow of multiple cache lines utilizing two addressing modes.

Illustrated in FIG. 3 is an exemplary layout of groups of words that are retrieved from Main Memory 16 to form a plurality of cache lines in Cache 14. As used herein, each group of words forms a cache line and the number of words in each group may vary (typically as a multiple of two). In the illustrated form, each cache line is represented having four data words of arbitrary uniform bit width. Again, word and bit sizes are a matter of choice in practicing the present invention. A word may be eight, sixteen, thirty-two, sixty-four or other bits in length. Sequential data words D0 through D3 are stored in a same cache line in a linear manner. Similarly data words D4 through D7 are stored in another cache line and data words D8 through D11 are stored in yet another cache line. It should be well understood that the illustrated cache lines of FIG. 3 may or may not be physically contiguous in a cache.

Illustrated in FIG. 4 is an example of the retrieval of the data words from the Main Memory 16 of FIG. 1 using two different modes of memory addressing. Data words D2, D3, D0 and D1 form a first cache line and data words D4, D5, D6 and D7 form a second cache line sequential to the first cache line. Initially, Memory Interface 15 begins operation in a wrap mode of addressing. This addressing mode will only last for addressing of the first cache line. Assume that data word D2 is the first or critical word to be addressed from the first cache line. Therefore, data word D2 and then data word D3 are addressed. However, because the memory addressing is in a wrap mode and to make the retrieved cache line be valid, the data words D0 and D1 are retrieved to complete the retrieval of the entire cache line. An arrow in FIG. 4 indicates that the wrap occurs in retrieving word D0 after word D3. If the addressing mode were to stay in the wrap mode, the fifth data word to be retrieved would again be data word D2. However, since the Memory Interface 15 switches to a linear mode of addressing after the completion of filling the first cache line, the data word D4 is addressed immediately after data word D1. To implement, in part, the change in addressing mode from wrap around mode to a linear mode, the Load Address signal is suppressed or not activated by Interface 15. Although Address Generator 28 of Main Memory 16 is pointing the next address after word D1 to D4, a generation of the Load Address signal by Interface 15 will override Main Memory 16. Therefore, Interface 15 functions to not override the mode change at the end of the cache line boundary by suppressing or not asserting the Load Address signal.

When implementing an addressing mode change, the first sequential address after the cache line that was filled while in the wrap addressing mode will become the first word of the next cache line in the linear addressing mode. Additional signaling circuitry is required should any other starting address in the linear addressing mode be determined to be useful.

Figure 5:
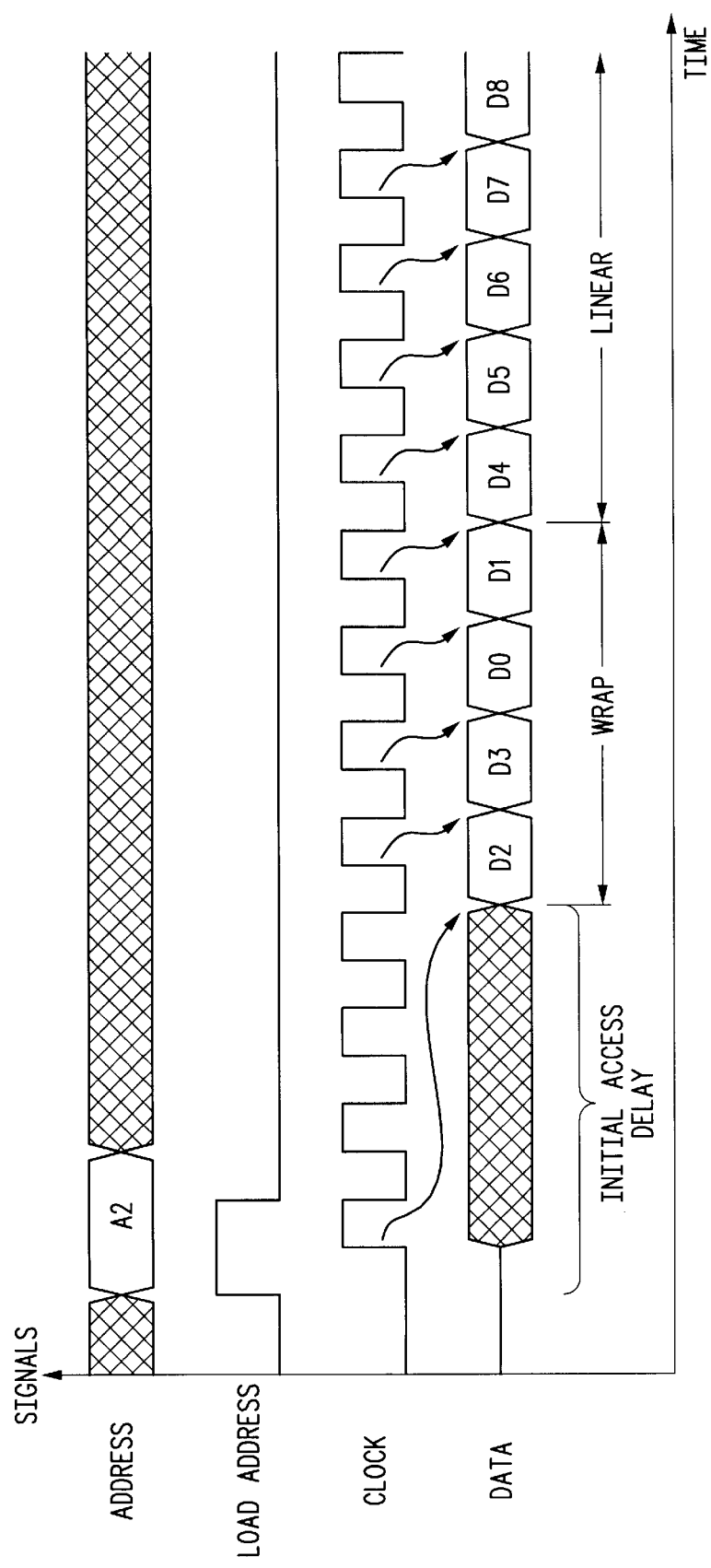
FIG. 5 illustrates an exemplary timing diagram associated with the memory interface of FIG. 1.

Illustrated in FIG. 5 is a timing diagram that further illustrates the cache fill operation of FIG. 3 and FIG. 4 in data processing system 10 of FIG. 1. When Interface 15 provides Main Memory 16 with an active high Load Address signal, the Address that is presented by Interface 15 is the memory address in Main Memory 16 that is being requested to be written from Main Memory 16 to Cache 14. In the example provided in FIG. 5, Processor 12 has executed an instruction that resulted in a request for the data at address location A2 that specifies the data word D2. Data word D2 will be available after an initial access delay to Main Memory 16 has elapsed. The access delay varies from implementation to implementation but may be several clock cycles in length. The present invention functions to reduce the occurrence of this access delay as much as possible. The address is provided by Cache 14 to Interface 15 and may be converted to another form to be presented to Main Memory 16. Interface 15 selectively provides a high speed Clock signal that, in one form, begins when the Load Address signal becomes active. It should be well understood that the Clock signal may be free-running and used to clock only for the functionality illustrated in FIG. 5.

By now it should be appreciated that there has been provided a memory interface and protocol which efficiently utilizes a wrap sequence and a linear sequence to read a main memory and write information to a cache. The described method enables an initial address to quickly retrieve a most critical word in a cache line where the most critical word is not at the beginning of a cache line. Additionally, completion of the cache line is allowed to validate the line prior to converting the addressing mode to a linear sequence. As a result, delay is minimized when switching addressing modes between wrap around and linear addressing while a very efficient addressing scheme for a processor is provided. Additionally, significant power savings may be realized through the use of the present invention. In particular, the savings of avoiding a Load Address initial access delay results in saved clocks which translates to saved power as well as time performance. Further, the signal transition savings realized by the minimization of Load Address cycles is significant in terms of power. In one form, Processor 12, Cache 14 and Interface 15 are implemented in a same integrated circuit and Main Memory 16 is implemented in a separate integrated circuit. However, it should be apparent that the functionality of the memory interface may be distributed between such integrated circuit boundaries.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An integrated circuit, comprising:
   a cache comprising a plurality of cache lines, wherein the plurality of cache lines is characterized by comprising a plurality of words that are sequential and that begin with a boundary word at a line boundary;
   interface means coupled to the cache, the interface means providing a clock signal and a load address signal for initiating a fill of a predetermined cache line in the plurality of cache lines in response to receiving an address; and
   a memory coupled to the interface means, the memory providing a first cache line of data to the cache in a wrap around mode format by providing a most critical word first in the first cache line in response to assertion of the load address signal, and thereafter automatically and continuously providing subsequent cache lines of data in a linear addressing mode format in response to suppression of the load address signal.

2. The integrated circuit of claim 1, wherein the memory is external to the integrated circuit and provides data in a bursting mode to the cache and further comprises an address generator that sequentially controls outputting of data in the wrap around mode format and the linear addressing mode format in response to assertion of the load address signal, the address generator reverting to the wrap address signal.

3. An integrated circuit, comprising:
   a memory having memory cells organized by groups of words, wherein the groups of words are sequential, and wherein an initial group of the groups of words is selected by a first portion of an address and a word within the initial group is selected by a second portion of the address; and an address generator, coupled to the memory, for, in response to receiving a running clock and a load address signal, directing the memory to provide the words of the initial group in a wrap sequence beginning with the word selected by the second portion of the address, and while suppressing the load address signal automatically and continuously providing one or more words of a second group of the groups of words in a linear sequence, wherein the second group automatically follows in sequence form the initial group.

4. The integrated circuit of claim 3, wherein the memory comprises a memory array, a decoder coupled to the memory array, a plurality of latches coupled to the memory array, a plurality of output drivers coupled to the memory array, and an input for receiving a mode signal to selectively change addressing order of how the groups of words are communicated by the memory.

5. The integrated circuit of claim 4, wherein the plurality of latches comprises a first latch and a second latch coupled to the memory array.

6. The integrated circuit of claim 5, wherein the second latch is characterized as storing a predetermined group of words that is provided as an output.

7. The integrated circuit of claim 6, wherein the first latch is characterized as storing an addressed group of words most recently accessed from the memory array.

8. The integrated circuit of claim 7, wherein the plurality of output drivers serially provide single words, each selected by the address generator, from the predetermined group of words stored in the second latch.

9. A memory having a burst mode characterized by bursting groups of words in which, in response to an address, a running clock and a control signal, an initial burst of a group of words is provided in a wrap sequence format and one or more immediately following bursts are automatically and continuously provided in a linear sequence while the control signal is suppressed.

10. The memory of claim 9, comprising a memory array, a decoder coupled to the array, an address generator coupled to the decoder and receiving the control signal, and an output means, coupled to the decoder and the memory array, for providing, under control of the address generator, the initial burst and the one or more immediately following bursts as an ouput of the memory.

11. The memory of claim 10, wherein the memory array is a non-volatile memory.

12. The memory of claim 10, wherein the address generator increments addresses used to determine location of information in the memory array.

13. A method of filling sequential first and second lines in a cache, wherein each of the first and second lines comprises a plurality of words, comprising:

loading the plurality of words of a first of the first and second lines in a wrap sequence in response to an asserted load address signal; and automatically changing addressing modes and loading the plurality of words of a second of the first and second lines in a linear sequence in response to suppressing the load address signal.

14. The method of claim 13, further comprising:

providing and loading an initial address which corresponds to an initial word of the first of the first and second lines;

fetching the initial word prior to fetching any other word in the first of the first and second lines;

filling a remainder of the first of the first and second lines after loading the initial word in the first of the first and second lines;

automatically fetching all words in the second of the first and second lines in the linear sequence while the load address signal is suppressed; and filling the second of the first and second lines in the linear sequence while the load address signal is suppressed.

15. The method of claim 14, wherein the fetching the words in the first and second lines is in response to a running clock and further comprising receiving a mode signal to selectively fill the sequential first and second lines of the cache using a different addressing mode.

16. A method of providing groups of words from a memory in response to an initial address that is misaligned with a boundary of an initial group of words, comprising:

providing the initial group of words, after an access delay, in response to a running clock, the initial address, and a load address signal in a wrap sequence; and automatically providing words of a first subsequent group that immediately follows the initial group in a linear sequence beginning at a boundary of the first subsequent group in response to suppression of the load address signal and the running clock, the words of the first subsequent group being provided without the access delay.

17. The method of claim 16, further comprising:

continuing to suppress the load address signal and provide words of an additional plurality of subsequent groups that immediately follow the first subsequent group in a linear sequence in response to the running clock and without the access delay.

\* \* \* \* \*

UNITED STATES PATENT AND TRADEMARK OFFICE
CERTIFICATE OF CORRECTION

PATENT NO.    : 6,574,707 B2
DATED         : June 3, 2003
INVENTOR(S)   : Craig D. Shaw It is certified that error appears in the above-identified patent and that said Letters Patent is hereby corrected as shown below:

<u>Column 6,</u>
Line 65, please change as follows:
2. The integrated circuit of claim 1, wherein the memory is external to the integrated circuit and provides data in a bursting mode to the cache and further comprises an address generator that sequentially controls outputting of data in the wrap around mode format and the linear addressing mode format in response to assertion of the load address signal, the address generator reverting to the wrap around mode format for a single cache line in response to assertion of the load address signal.

Signed and Sealed this

Twenty-seventh Day of January, 2004

JON W. DUDAS
*Acting Director of the United States Patent and Trademark Office*